(12) United States Patent
Grayson et al.

(10) Patent No.: US 8,447,314 B2
(45) Date of Patent: May 21, 2013

(54) SYSTEM AND METHOD FOR PROVIDING RESOURCE MANAGEMENT IN A NETWORK ENVIRONMENT

(75) Inventors: Mark Grayson, Maidenhead (GB); James A. Tavares, Randolph, NJ (US)

(73) Assignee: Cisco Technology, Inc., San Jose, CA (US)

( * ) Notice: Subject to any disclaimer, the term of this patent is extended or adjusted under 35 U.S.C. 154(b) by 596 days.

(21) Appl. No.: 12/643,830

(22) Filed: Dec. 21, 2009

(65) Prior Publication Data

US 2011/0151886 A1 Jun. 23, 2011

(51) Int. Cl.
*H04W 72/04* (2009.01)
(52) U.S. Cl.
USPC ........................................ 455/452.1
(58) Field of Classification Search
USPC .................. 455/435.1, 456.1, 434, 436, 437, 455/403, 444, 411, 447, 448, 449, 422.1, 455/443, 426.1, 432.2, 450, 464, 451, 452, 455/453, 454, 509; 370/328–338
See application file for complete search history.

(56) References Cited

U.S. PATENT DOCUMENTS

| | | | |
|---|---|---|---|
| 6,094,578 A | 7/2000 | Purcell et al. | |
| 6,185,205 B1 | 2/2001 | Sharrit et al. | |
| 6,233,315 B1 | 5/2001 | Reformato et al. | |
| 6,813,250 B1 | 11/2004 | Fine et al. | |
| 6,912,389 B2 | 6/2005 | Bright et al. | |
| 7,072,952 B2 | 7/2006 | Takehiro et al. | |
| 7,339,900 B2 | 3/2008 | Perlman | |
| 7,352,707 B2 | 4/2008 | Ho et al. | |
| 7,369,513 B1 | 5/2008 | Sankaran | |
| 7,460,492 B2 | 12/2008 | Portolani et al. | |
| 7,463,597 B1 | 12/2008 | Kompella | |
| 7,613,444 B2 * | 11/2009 | Lindqvist et al. | ............. 455/403 |
| 8,064,909 B2 * | 11/2011 | Spinelli et al. | ................ 455/436 |
| 8,098,597 B2 * | 1/2012 | Semper | ......................... 370/255 |
| 8,121,089 B2 * | 2/2012 | Bao et al. | ......................... 370/331 |
| 8,244,262 B2 * | 8/2012 | Lee et al. | ....................... 455/450 |
| 2006/0281471 A1 | 12/2006 | Shaffer et al. | |
| 2007/0286212 A1 | 12/2007 | Kim et al. | |
| 2010/0298005 A1 | 11/2010 | Yavuz et al. | |
| 2011/0319084 A1 | 12/2011 | Meshkati et al. | |
| 2012/0046063 A1 | 2/2012 | Chande et al. | |

OTHER PUBLICATIONS

Wikipedia, "Plectron," http://en.wikipedia.org/wiki/Plectron, Dec. 18, 2008, 2 pages.

(Continued)

*Primary Examiner* — Melody Mehrpour
(74) *Attorney, Agent, or Firm* — Patent Capital Group

(57) ABSTRACT

An example method includes receiving data from a femto access point; evaluating resources being used by a macro network in which the femto access point resides; determining whether the femto access point is operating in a constrained bandwidth mode; and reserving particular resources for the femto access point to use for its communications, where the particular resource is allocated from available resources within the macro network. In a more particular embodiment, where those resources refer to spectrum resources, the method includes allocating spectrum resources between femto and macrocellular systems. In other embodiments, the method includes identifying a total throughput associated with the femto access point and one or more macro network cells, where a change in reserving particular frequencies is executed based on determining the total throughput being higher than a current throughput. The data from the femto access point can include path loss data and geolocation data.

20 Claims, 8 Drawing Sheets

OTHER PUBLICATIONS

Thunder Eagle, Inc.—Radio Wireless Alerting Systems, "MRI-100™: Multi Radio Interface," http://www.thuneagle.com/mri100.htm, Dec. 18, 2008, 2 pages.
Positron Public Safety Systems, "Product Specifications: Power RADIO," http://www.positron911.com/products/powerRADIO/powerRADIO_specs.asp, Dec. 18, 2008, 2 pages.
Wikipedia, "Minimum spanning tree," http://en.wikipedia.org/wiki/Minimum_spanning_tree, Dec. 18, 2008, 5 pages.
Wikipedia, "Distributed minimum spanning tree," http://en.wikipedia.org/wiki/Distributed_minimum_spanning_tree, Dec. 18, 2008, 2 pages.
Broadband Forum, "TR-196 Femto Access Point Service Data Model," Issue 1; Issue Date: Apr. 2009; 131 pages.
V. Chandrasekhar and J.G.Andrews, "Femtocell Networks: A Survey," The University of Texas at Austin; A. Gatherer, Texas Instruments; Jun. 28, 2008; 23 pages.
Kineto Wireless, Inc., "UMA: The 3GPP Standard for Femtocell-to-Core Network Connectivity," Aug. 2007; 9 pages.
Joey Chou, "Self-Organizing Networks," http://wirelessman.org/tgm/contrib/C80216m-08_1387.pdf; Oct. 31, 2008; 4 pages.
Mo-Han Fong et al., "Proposal for IEEE 802.16m Support for Self Organizing Networks," http://wirelessman.org/tgm/contrib/C80216m-08_1407.pdf; 8 pages.
F. Adrangi et al., Identity Selection Hints for the Extensible Authentication Protocol (EAP); RFC 4284; Jan. 2006; http://ietfreport.isoc.org/rfc/PDF/rfc4284.pdf; 14 pages.
U.S. Appl. No. 13/017,659, filed Feb. 2, 2011, entitled "System and Method for Coordinating Femto Interference in a Network Enviroment,"Inventor: Mark Grayson.
Yeliz Tokgoz, et al., "1xEV-DO Femtocell Performance and Capacity Analysis," Qualcomm, Feb. 2010, 7 pages.
USPTO Nov. 26, 2012 Non-Final Office Action from U.S. Appl. No. 13/019,659.

\* cited by examiner

SYSTEM AND METHOD FOR PROVIDING RESOURCE MANAGEMENT IN A NETWORK ENVIRONMENT

TECHNICAL FIELD

This disclosure relates in general to the field of communications and, more particularly, to providing resource management in a network environment.

BACKGROUND

Networking architectures have grown increasingly complex in communication environments. Femto cells have gained recent notoriety due to their capabilities. In general terms, femto cells represent wireless access points that operate in licensed spectrum to connect mobile devices to a mobile operator's network (e.g., using broadband connections). For a mobile operator, the femto cells offer improvements to both coverage and capacity: particularly indoors. There may also be opportunities for new services, while reducing the overall cost of providing network access. Femto cells can also offer an alternative way to deliver the benefits of fixed-mobile convergence. For many femto scenarios, connectivity and/or resource allocation protocols can pose a number of problems for end users and network operators alike.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EXAMPLE EMBODIMENTS

Overview

A method is provided in one example embodiment and includes receiving data from a femto access point; evaluating resources being used by a macro network in which the femto access point resides; determining whether the femto access point is operating in a constrained bandwidth mode; and reserving particular resources for the femto access point to use for its communications, where the particular resource is allocated from available resources within the macro network. In a more particular embodiment, where those resources refer to spectrum resources, the method includes allocating spectrum resources between femto and macrocellular systems. In other embodiments, the method includes identifying a total throughput associated with the femto access point and one or more macro network cells, where a change in reserving particular frequencies is executed based on determining the total throughput being higher than a current throughput. The data from the femto access point can include path loss data and geolocation data. Also, geolocation data can be used in determining how to allocate the available frequencies in the macro network to one or more femto access points. If a number of resource constrained requests from one or more femto cells pass a predetermined threshold, self organizing network operations are triggered to shift a portion of the spectrum resources from the macro network to the one or more femto cells. In yet other embodiments, cell channel power is measured during idle periods in order to determine if the femto access point is in proximity to a neighboring femto access point or a macro-cellular base station using the same channel, and if the cell channel power passes a given threshold, a signal is sent to a femto management element.

Example Embodiments

Figure 1:
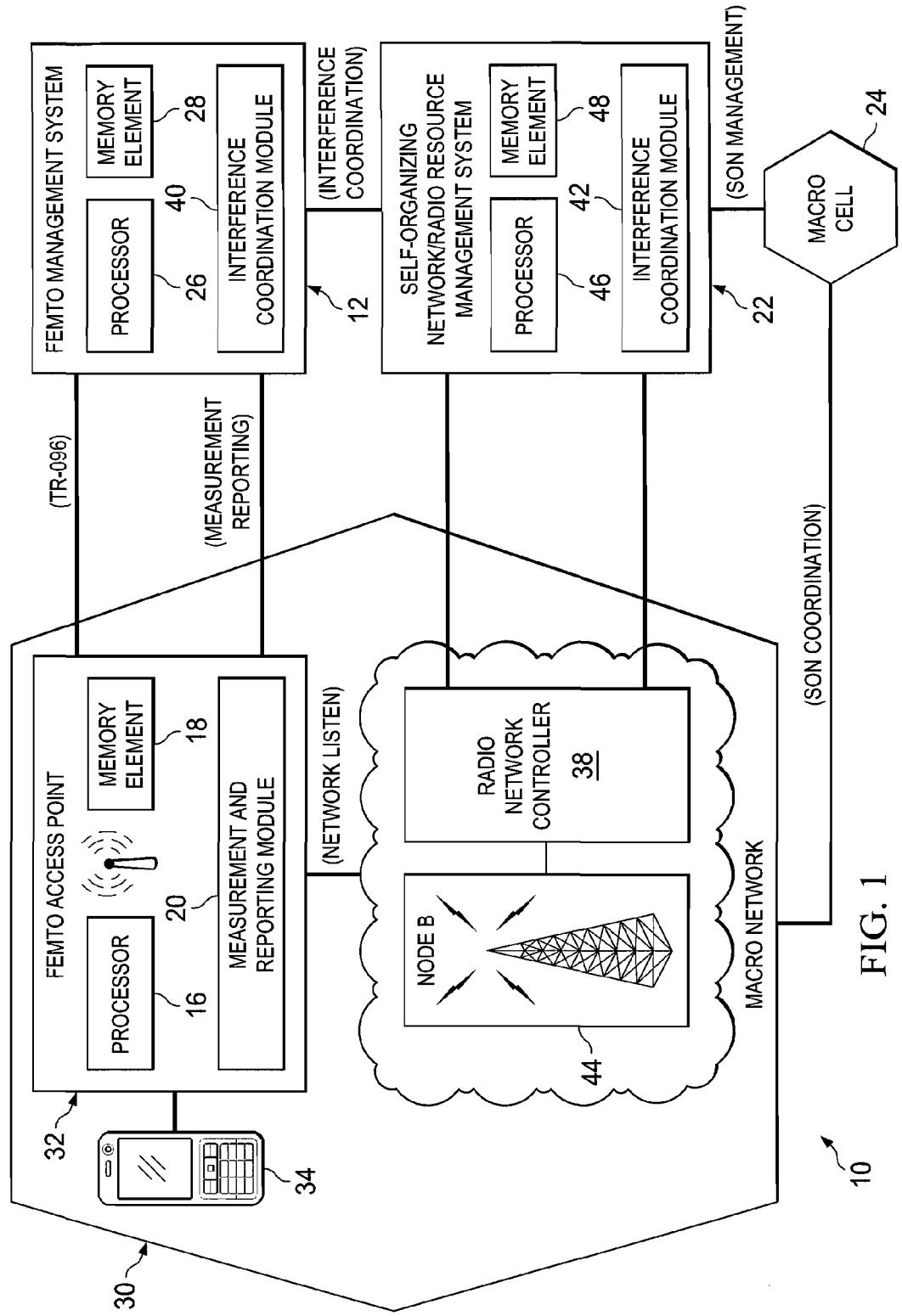
FIG. 1 is a simplified block diagram of a communication system for providing resource management in a network environment in accordance with one embodiment of the present disclosure.

Turning to FIG. 1, FIG. 1 is a simplified block diagram of a communication system 10 for providing access in a network environment. FIG. 1 includes a femto management system 12, a self-organizing network (SON)/radio resource management system 22, a macro network 30, a femto access point 32, a mobile node 34, and a radio network controller (RNC) 38, which is configured to interface with a Node B 44. Femto management system 12 may include a processor 26, a memory element 28, and an interference coordination module 40. In a similar configuration, SON/radio resource management system 22 may include a processor 46, a memory element 48, and an interference coordination module 42. Additionally, femto access point 32 may include a processor 16, a memory element 18, and a measurement and reporting module 20. FIG. 1 could represent a traditional wideband code division multiple access (WCDMA) deployment. A protocol could exist within the architecture such that broadcasting occurs between various elements within the system to optimize system operation. For example, a system information block (SIB) protocol could be used to broadcast resource information within the system. For example, the SIB broadcast from Node B 44 in the macro network could indicate the scrambling codes used by femto access point 32.

Also depicted in FIG. 1 is a macro cell 24, which has a logical connection to macro network 30 and SON/radio resource management system 22. SON coordination exists between macro network 30 and macro cell 24. In addition, SON management occurs between SON/radio resource management system 22 and macro cell 24. As shown in FIG. 1, interference coordination modules 40 and 42 can interact in order to exchange information, which may include measurement reporting data. Femto access point 32 and femto management system 12 can also interact in order to exchange data involving IP communications (e.g., data associated with technical report (TR)-196 protocols).

Note that Orthogonal Frequency-Division Multiple Access (OFDMA) is a multi-user version of the orthogonal frequency-division multiplexing (OFDM) digital modulation scheme. In alternative embodiments, femto access point 32 and the macro-cell base station are configured to use OFDMA technology. Multiple accesses is achieved in OFDMA by assigning subsets of subcarriers to individual users. This allows simultaneous low data rate transmission from several users. Macro-cellular OFDMA systems are typically defined and deployed using fractional frequency re-use concepts. This can involve concentric circles around a cell site being used to deploy different frequency re-use schemes, from 1/1 close to the cell center, 2/3 further out from the center, and 1/3 approaching the cell boundary. In this way, inter-cell interference is minimized. Femto deployments can be difficult because of the level of autonomy and dynamic variability in location and availability of femto cells, which [in turn] makes inter-cell interference management challenging. Whereas traditional WCDMA based femto systems can make use of scrambling codes to enable co-existence between femto and macro systems, OFDMA based femto cell deployments are more challenged since they do not rely on scrambling codes to provide resource separation. Instead, one of the key resource sharing techniques is to be able to optimally allocate the subsets of carriers between femto cell and macrocellular deployments.

Furthermore, as OFDMA channel bandwidths increase, operators are increasingly motivated to avoid specifically partitioning spectrum exclusively for femto use and instead deploy OFDMA femto in a co-channel fashion with the macro network. This arrangement effectively breaks the concentric circle approach for conventional planning and inter-cell interference minimization techniques. Hence, solutions for minimizing inter-cell interference in OFDMA deployments are desired. As a general proposition, femto protocols typically have autonomous rules for configuration in the network. A larger issue addresses how to integrate a femto cell (also referred to as a "femto" more generally, or as a "femto access point" in this Specification) into a macro network. In this context, some compromises are reached in effectively allocating and coordinating resource allocations between a femto cell and the macro network.

Example embodiments of the present disclosure provide a technique that supports optimized femto radio resource management in co-channel deployments. This could allow for better usage of spectrum and better aggregate network throughput in situations involving a constrained set of resources, in particular involving constrained spectrum resources. In certain example implementations, femto cell management system 12 (e.g., in the context of TR-196) can be defined to interface with a self-organizing network/radio resource management (RRM) capability of the macro network. When a femto cell is activated, it is responsible for signaling femto management system 12 that it has been activated. Femto management system 12 can be configured to allocate a specific group of sub-carriers to the femto cell (i.e., to femto access point 32). Femto access point 32 can be responsible for signaling the macro cell identity in which it is located. Measurement and reporting can also be exchanged between femto access point 32 and femto management system 12 (e.g., path loss data and geolocation data).

Femto management system 12 can be responsible for determining in which concentric circle the femto is located (e.g., by interfacing with the macro SON/RRM system). For example, when a femto access point is activated and determined to be in the 1/1 frequency re-use region, the reported path loss information can be used by femto management system 12 to determine the level of co-channel interference between the femto access point 32 and the macrocell Node B 44. If the cumulative co-channel interference crosses a predetermined threshold, femto management system 12 may provide an indication to the macro that this region should now operate in fractional frequency re-use mode (e.g., using 2/3 re-use). Femto access point 32 can be responsible for indicating to femto management system 12 if it is operating in resource constrained mode. In one embodiment, the resources can refer to bandwidth generally, or the fact that sufficient backhaul capacity is available but new service requests have to be rejected because of insufficient spectrum resources that are currently allocated to the femto access point. As used herein in this Specification, the term 'con-strained resource mode' is meant to connote any limitation being imposed on a given femto access point such that their communications are being inhibited in some manner due to restrictions in available resources. These limitations may restrict the communications ability of the femto access point. These restrictions could relate to the speed of femto access point communications, quality of service issues, data capacity, loss rate, interference characteristics, or any other parameter that may offer a sub-optimal communication pathway for a given femto access point.

Femto management system 12 is operable to combine reported information from all the femto cells in the concentric circles around each macro cell. In one embodiment, the combination may be a simple accumulation of resource constraints. In another embodiment, the combination may be the accumulation of the product of the resource constraints and observed path loss between the femto access point and the macro network. In general, the combination may be any mathematical combination of the reported information. If the combination of the reported information passes a threshold, femto management system 12 can trigger SON operations to shift further resources from the macro network towards the femto network, in which case femto management system 12 can reconfigure the OFDMA femto cells to use the new available resources.

In operation of one example implementation, when coordinating inter-femto interference, a femto access point can periodically measure the sub-channel power during idle periods in order to determine if it is in close proximity to a neighbor cell (corresponding to either a femto access point or to a macro base station) using the same sub-carriers. If the sub-channel power passes a given threshold, it can report this to femto management system 12. If it can decode the E-UTRAN cell global identifier (ECGI) and physical cell identifier (PCI) [ECGI/PCI], it can signal femto management system 12.

Femto management system 12 can be responsible for setting up a message exchange between femtos in close proximity (e.g., based on EGCI/PCI). The signaling link between femto cells can be used to coordinate access to the shared resource and avoid interference. This signaling may indicate the resource utilization for each femto, allowing optimum allocation between femto cells. Thus, communication system 10 allows femto management system 12 to aggregate requests on behalf of femto cells and, further, enables a scaling of SON operations. Additionally, the architecture can employ the use of banding of femtos according to where they are located within the cell, and this further allows for optimum resource allocation between macro and femto cells, for example enabling the integration of fraction frequency re-use between femto and macro systems.

Before turning to some of the operations of this architecture, a brief discussion is provided about some of the infrastructure of FIG. 1. Mobile node 34 can be associated with clients or customers wishing to initiate a communication in communication system 10 via some network. The term 'mobile node' is inclusive of devices used to initiate a communication, such as a computer, a personal digital assistant (PDA), a laptop or electronic notebook, a cellular telephone, an i-Phone, an IP phone, or any other device, component, element, or object capable of initiating voice, audio, video, media, or data exchanges within communication system 10. Mobile node 34 may also be inclusive of a suitable interface to the human user, such as a microphone, a display, a keyboard, or other terminal equipment. Mobile node 34 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, or script data, or any type of source or object code, or any other suitable information in any appropriate format that may be communicated from one point to another.

Femto management system 12 is a network element configured to interface with femto access point 32. In one example, as femto access point 32 powers on, it reports its geolocation information and receives from femto management system 12 resource allocations. In one embodiment, theses resources can refer to scrambling code allocation information for WCDMA femto cells. In another embodiment, these resources can refer to sub-carriers assignments for OFDMA femto cells.

Macro network 30 represents a series of points or nodes of interconnected communication paths for receiving and transmitting packets of information that propagate through communication system 10. Macro network 30 offers a communicative interface between mobile node 34 and selected nodes in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. Macro network 30 may implement a user datagram protocol (UDP)/internet protocol (UDP/IP) connection and use a transmission control protocol (TCP/IP) communication language protocol in particular embodiments of the present disclosure. However, macro network 30 may alternatively implement any other suitable communication protocol for transmitting and receiving data packets within communication system 10.

Macro network 30 includes a given coverage area for servicing multiple end users and for managing their associated connectivity. Macro network 30 represents one or more macro cells, which can provide access to a group of mobile nodes 34. Macro network 30 could have a multitude of femto cells (for example, Node B 44 may provide macro coverage over an area including 1000 femto cells). In this example of FIG. 1, macro network 30 includes femto access point 32. A single cell could have multiple neighbors such that femto access point 32, for example, could include information describing the various neighboring cells in its signaling messages.

In one example implementation, femto access point 32 is a small cellular base station designed for use in residential or business environments. Femto access point 32 can connect to the service provider's network (e.g., macro network 30) via broadband (such as DSL, WiMAX, WiFi, cable, etc.) in one example. Femto access point 32 can offer an access point base station, and support multiple active mobile nodes in a given setting (e.g., business, residential, etc.). In one example implementation, femto access point 32 communicates with mobile node 34 over a radio interface using licensed spectrum and, further, connects to the mobile network infrastructure over a fixed broadband connection. The femto cell can allow a service provider to extend service coverage indoors, especially where access would otherwise be limited or unavailable. The femto cell can incorporate the functionality of a typical base station, but extend it to allow a simpler, self-contained deployment. An example implementation of femto access point 32 is a Universal Mobile Telecommunications System (UMTS) femto cell containing a Node B, RNC, and a GPRS support node (SGSN) with Ethernet for backhaul. The concepts presented herein are applicable to all standards, including GSM, CDMA2000, TD-SCDMA, WiMAX, LTE, etc.

Example embodiments can include location derivation for the femto cell. For example, femto access point 32 may include a geolocation functionality and report this information to the network (e.g., during provisioning). As used herein in this Specification, the term 'geolocation' is meant to encompass various technologies that help to identify the location of a mobile node, end user, etc. This may include global positioning system (GPS) protocols, triangulation of radio waves approaches, or protocols that can track an Internet Protocol (IP) address, a MAC address, various RFID elements, hardware embedded via an article/production number, embedded software, etc. In other examples, such geolocation information may be associated with Wi-Fi connection locations, GPS coordinates, or self-disclosed information.

The architecture supports location-based services and this could involve a triangulation of radio waves, GPS activities, or various other operations that help to identify a general location for an end user. Some type of radio access network element can evaluate the location of a particular end user. In one example implementation, Node B 44 is relegated this task. This information can be provided to any suitable node in the network. For example, this location determination may be sent to SON/radio resource management system 22. At this point, a simple lookup may be used to determine which femto cells are within the vicinity of the user. In one example implementation, SON/radio resource management system 22 can determine overlapping femto cells. SON/radio resource management system 22 can be responsible for a given coverage area in which femto cells overlap each other. In other instances, a copy of this information (or portions thereof) may be kept (and/or updated at given intervals) at SON/radio resource management system 22 and/or RNC 38.

In operation, a typical femto deployment could include sub-carrier allocations being configured for a femto cell. As part of its power up procedure, the femto cell can tune its receiver and then monitor the power associated with each sub-carrier allocation. In one configuration, the femto cell can elect one of the sub-carrier block having the lowest power measurement in order to preserve interference characteristics. Femto cells can power on and contact a management system for a list of defined sub-carrier allocations. The sub-carrier allocation with the lowest interference characteristics could be selected. In regards to the mobile node, the mobile node can decode broadcast information from the macro cell and, further, measure the sub-carrier power. The mobile device can then reselect the femto cell in idle mode. Note that the activities described herein could primarily address OFDMA systems (and therefore implicate long term evolution (LTE) architectures). However, the mechanisms outlined herein could be equally applicable to WCDMA systems. The descriptions below discuss a WCDMA system, but other architectures (e.g., OFDMA) can readily employ the teachings described herein.

One embodiment of the invention relates to sharing resources within a WCDMA network. In such an example, RNC 38 can control a number of Node Bs 44. Traditionally, a static access configuration occurs at the RNC, where emissions occur at a Node B. RNC 38 generally operates as a management component for a radio interface. This management may be done through remote commands to a corresponding Node B within a mobile network. Some of the responsibilities of radio network controllers may include management of radio channels, providing measurement report commands and assisting in handoff/handover scenarios. RNC 38 can alternatively provide for outer loop power control, load control, admission control, packet scheduling, security functions, etc.

In using the architecture illustrated by FIG. 1, this configuration may be dynamically updated based on information exchanged with self organizing network system 22. In particular, femto management system 12 is operable to combine information from a plurality of femto access points 32 operating in a specific geolocation. Femto management system 12 is operable to signal self organizing network system 22, including information pertaining to the resources required by the collection of femto cells under its management and the geolocation area of said collection of cells. Self organizing network system 22, in co-operation with femto management system 12, can determine the optimal allocation of resources between those allocated to femto access points 12 and the macro Node Bs 44.

Node B 44 is a communications interface between mobile node 34 and RNC 38. Node B 44 could include a base transceiver station and a base station controller in one embodiment. The communications interface provided by the radio access network of Node B 44 may allow data to be exchanged between an end user and any number of selected elements within communication system 10. Node B 44 may facilitate the delivery of a request packet generated by mobile node 34 and the reception of information sought by an end user. Node B may include an interface to user devices to support optional SON operation, where the Node B signals end-user devices to perform measurements in order to determine its local operating environment, for example, which can be used to determine when an end user (attached to the Node B 44) is located in the vicinity of a femto access point. Node B 44 is only one example of a communications interface between an end user and Node B 44. Other suitable types of communications interfaces may be used for any appropriate network design and, further, be based on specific communications architectures in accordance with particular needs. SON/radio resource management system 22 can optimize network communications, and be configured to interface with Node B 44. Node B 44 is a communicative interface, which may comprise radio transmission/reception devices, components, or objects, and antennas. Node B 44 may be coupled to radio network controllers (via one or more intermediate elements) that use a landline (such as a T1/E1 line, for example) interface. Node B 44 may operate as a series of complex radio modems where appropriate. Node B 44 may also perform transcoding and rate adaptation functions in accordance with particular needs.

In one example implementation, SON/radio resource management system 22, femto access point 32, and femto management system 12 are network elements that facilitate or otherwise help coordinate resource management (e.g., for networks such as those illustrated in FIG. 1). As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, SON/radio resource management system 22, femto access point 32, and/or femto management system 12 include software (e.g., as part of interference coordination modules 40 and 42, and measurement and reporting module 20) to achieve the integration and/or resource management operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

In regards to the internal structure associated with communication system 10, each of femto access point 32, femto management system 12, and SON/radio resource management system 22 can include memory elements for storing information to be used in achieving the resource management operations, as outlined herein. Additionally, each of these devices may include a processor that can execute software or an algorithm to perform the resource management activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent by femto management system 12, femto access point 32, and/or SON/radio resource management system 22 could be provided in any database, register, control list, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the resource management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 1] could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Figure 2:
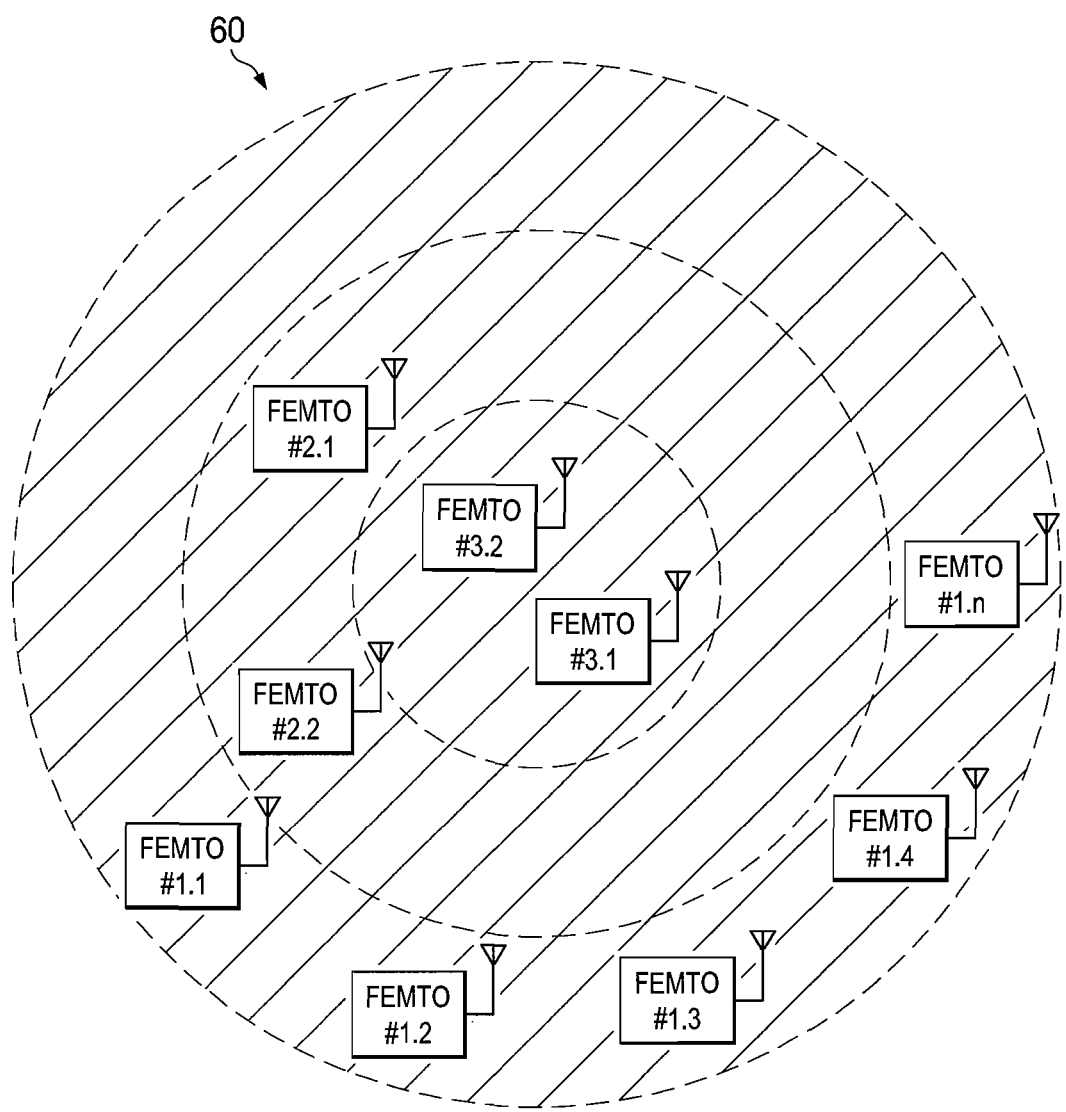
FIGS. 2-6 are simplified block diagrams illustrating example cells associated with the communication system of FIG. 1.

FIG. 2 is a simplified schematic diagram of a cell 60, which includes a number of femto cells indicating how resources can be shared between femto access points and the macro network. For example, using the example of spectrum resources, toward the center of cell 60, the user can use any of the provided frequencies (F1, F2, and F3). However, as the user moves to the edge of the cell, a fractional frequency can be used. Femto cells would like to share resources with the macro network and, further, avoid partitioning the spectrum between femto cells and the macro cells. In essence, the available resources for both types of cells are common, which means they need to be intelligently allocated.

In different scenarios, the only interference to be accounted for in FIG. 2 would be on the outer edge of cell 60, where other neighboring macro cells might be present. These interference issues would have to be coordinated for effective communications to occur. In contrast, in the context of femto cells, interference could be experienced throughout cell 60. For example, femto #3.2 represents a femto cell (i.e., a femto access point) operating in the center region of this cell 60, where this particular macro cell is using all three available frequencies (F1, F2, F3). In such a scenario, the moment that femto #3.2 is powered on, interference may become a prevalent issue, for example depending on the path loss experienced between the femto cell #3.2 and the macro-cell.

In this example, interference would be the highest as the femto moves toward the center of cell 60 (i.e., femto #3.2 and femto #3.1 would have the highest interference characteristics). Typically, such a cell configuration of overlapping cells does not occur. Cells are not typically planned to be deployed coincident with each other due to the aforementioned interference characteristics. Femto cells create a unique problem because they are commonly autonomously deployed in areas in which a macro cell already has coverage. For example, a given individual can purchase a femto access point (e.g., in a domestic setting) and deploy it immediately. The macro cell typically uses all of the available frequencies. The challenge lies in carving out resources from the macro cell to be used by the femto cells. In this example, frequency resources F1, F2, and F3 are shared between the femto access points and the macro cell base stations.

Figure 3:
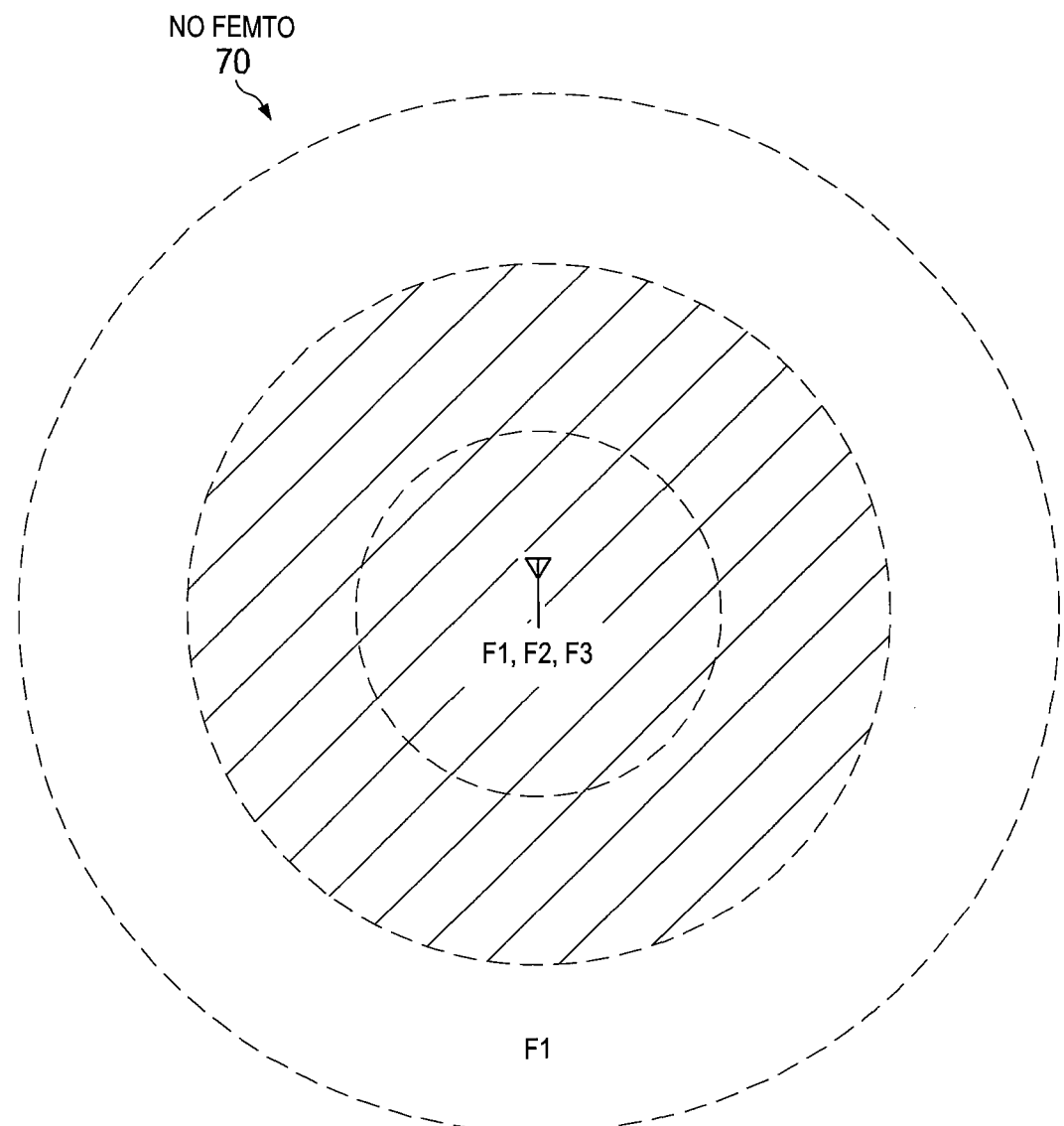

FIG. 3 is a simplified schematic diagram of a cell 70 in which there are no femto cells present. The representation of FIG. 3 could be indicative of any particular cell in the network. In this instance, a fractional frequency re-use can occur in this environment, as communications are properly coordinated. Note that in a significant part of cell 70, all frequencies are being used (frequencies F1, F2, and F3), where at the edge of cell 70 approximately one third of the tones are being used (within the frequency F1). A natural intersection occurs between cell boundaries such that interference can be problematic.

Figure 4:
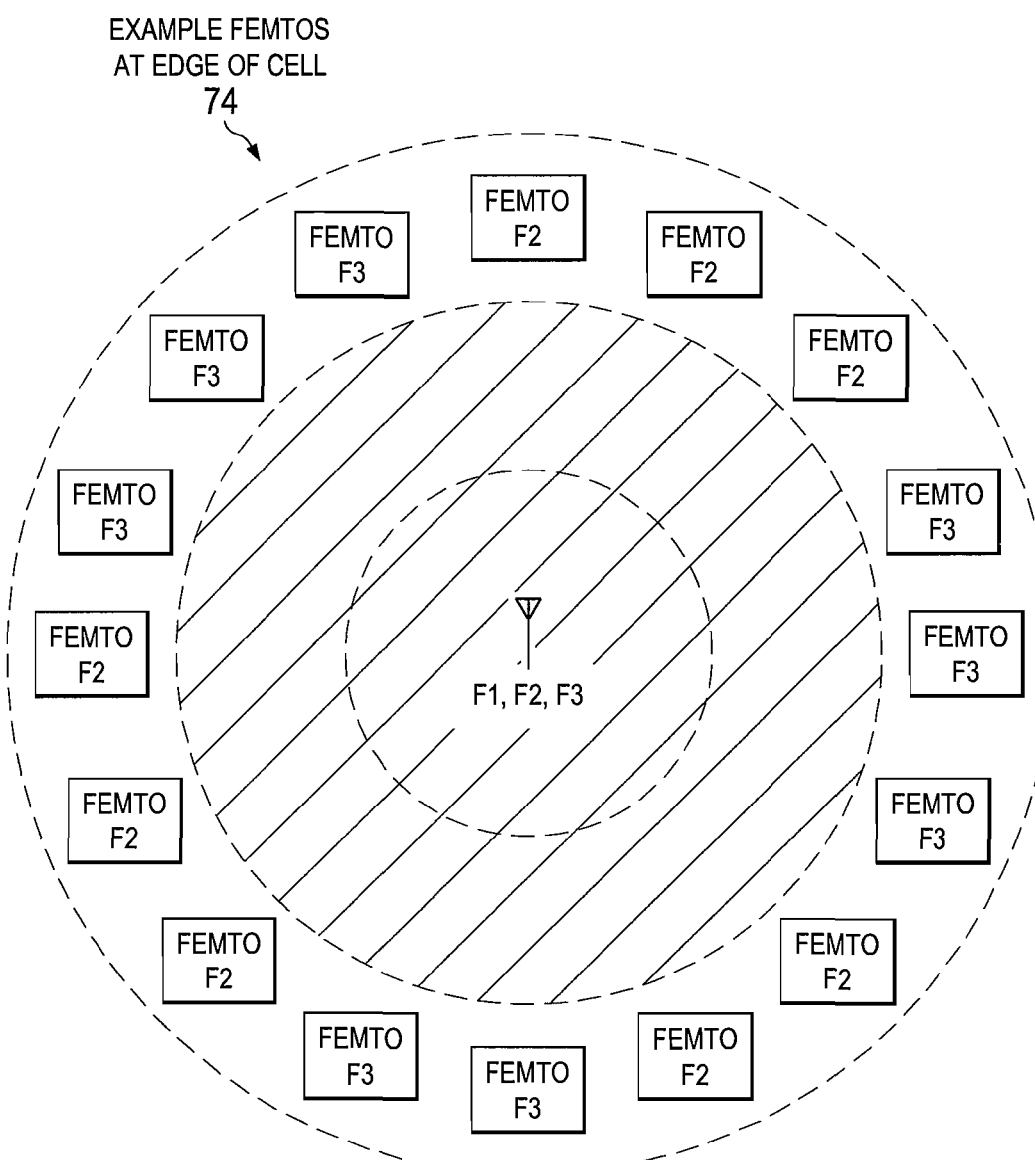

FIG. 4 is a simplified schematic diagram of a cell 74 in which a number of femto cells are deployed on a given edge. Communication system 10 can employ smart listening capabilities in order to allocate frequency two (F2) or frequency three (F3) for these particular femto cells. Additionally, the femto cells themselves can determine which of these two possible frequencies to use based on discovered neighboring cells. This decision can be made based on the least possible interference to be experienced by each individual femto cell. In the example of FIG. 4, each individual femto cell has chosen one of these two possible frequencies to use in their communications. In this example, approximately two thirds of the spectrum remains unused.

Figure 5:
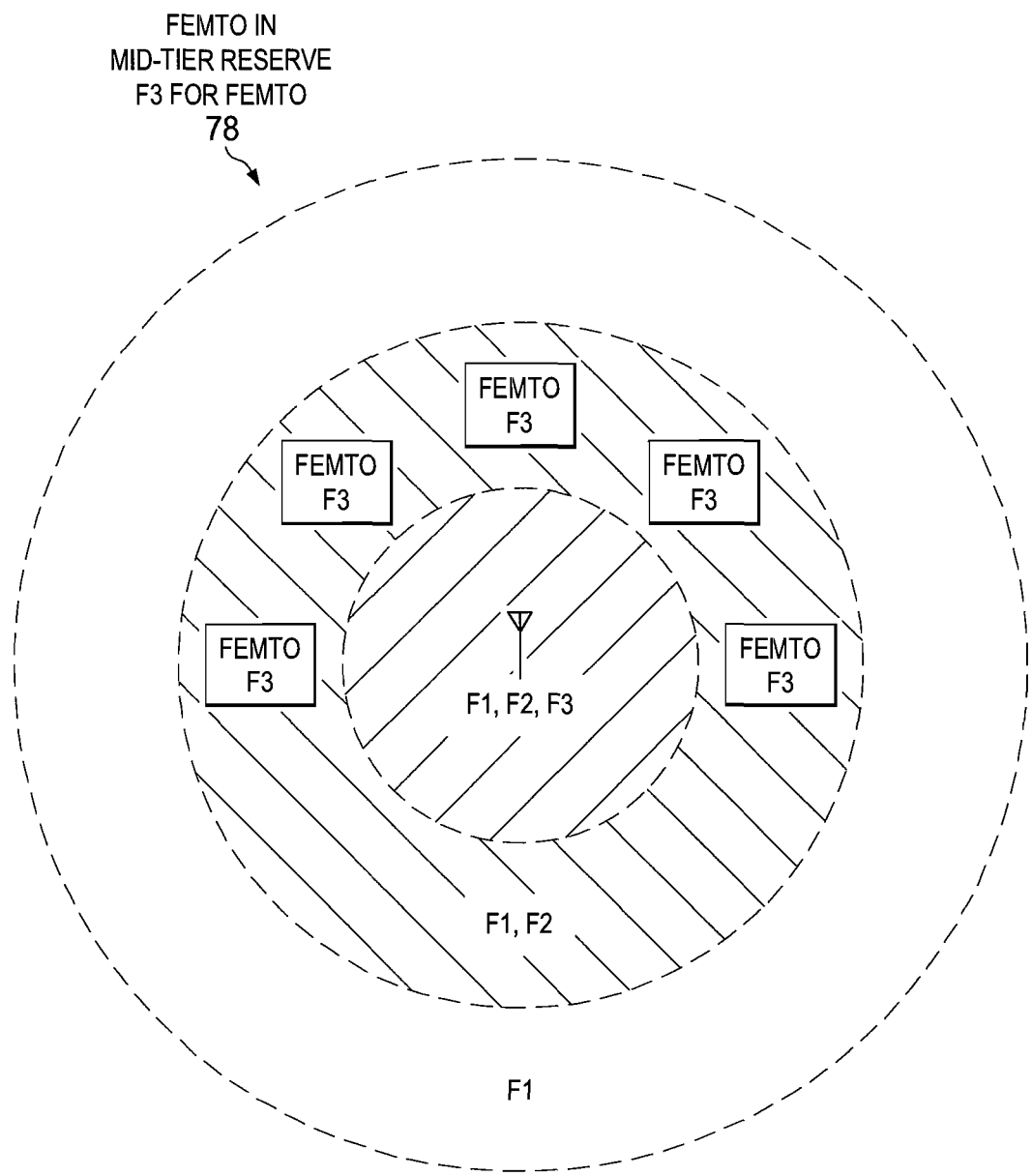

FIG. 5 is a simplified schematic diagram of a cell 78 in which femto cells are provided in a mid-tier range. As the number of femto cells accumulates in the mid-tier coverage area, some allocation can be made for reserving a particular frequency for femto usage. Note that previously, FIG. 3 depicted this mid-tier as having all of its resources being allocated to the macro network, which indirectly means that there would be no resources available for a given femto cell. To avoid this scenario, above a certain threshold, a determination can be made that the total throughput can be increased by removing resources from the macro network and allocating them to femto cells. Thus, each of the femto cells in the particular example of FIG. 5 are using frequency three (F3) for their communications. In one example implementation, an equation or an algorithm can be used in order to determine the maximum throughput to be accommodated by the system in intelligently allocating resources between the femto cells and cells in the macro network.

Figure 6:
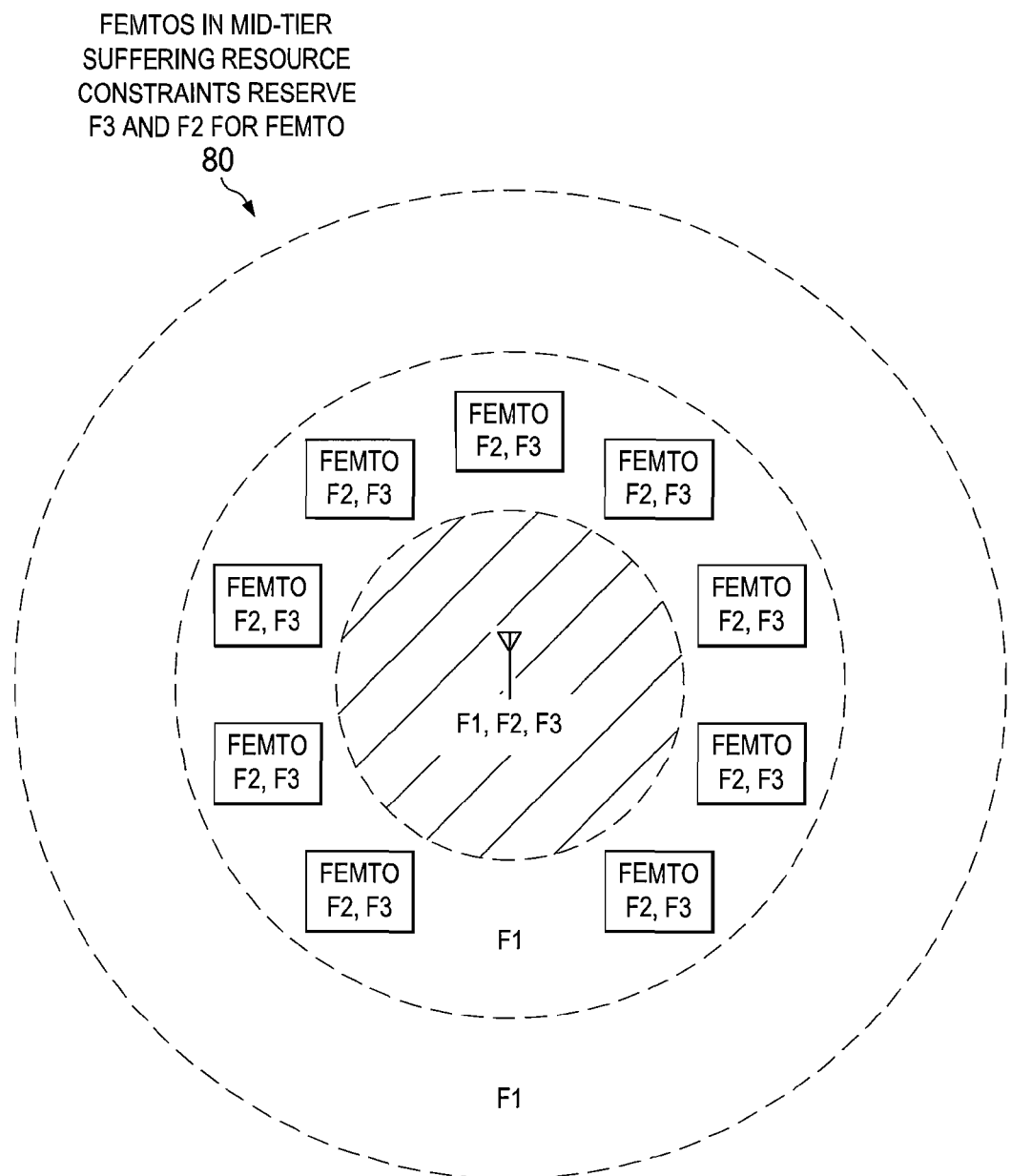

FIG. 6 is a simplified schematic diagram of a cell 80. FIG. 6 represents a natural progression from FIG. 5 such that femto cells in the mid-tier and that are suffering resource constraints can have both frequency three (F3) and frequency two (F2) reserved for them. In this particular example, the majority of users in the environment are indoors, and are proximate to femto cells such that more throughput can be achieved by the system in reserving these two frequencies for femto access points. In this particular example, the femto users can have two segments of the spectrum allocated for their communication needs. A smart allocation can be made to devote more spectrum resources to meet the particular needs of this specific scenario: namely, accommodating more femto users that are now prevalent in the system. Effectively, each femto cell can have their throughput increased by the configuration of cell 80. As a rough estimation or guide, throughput can equate to bandwidth and, therefore, the configuration of FIG. 6 has effectively increased the available bandwidth for each of the femto cells in the mid-tier.

Figure 7A:
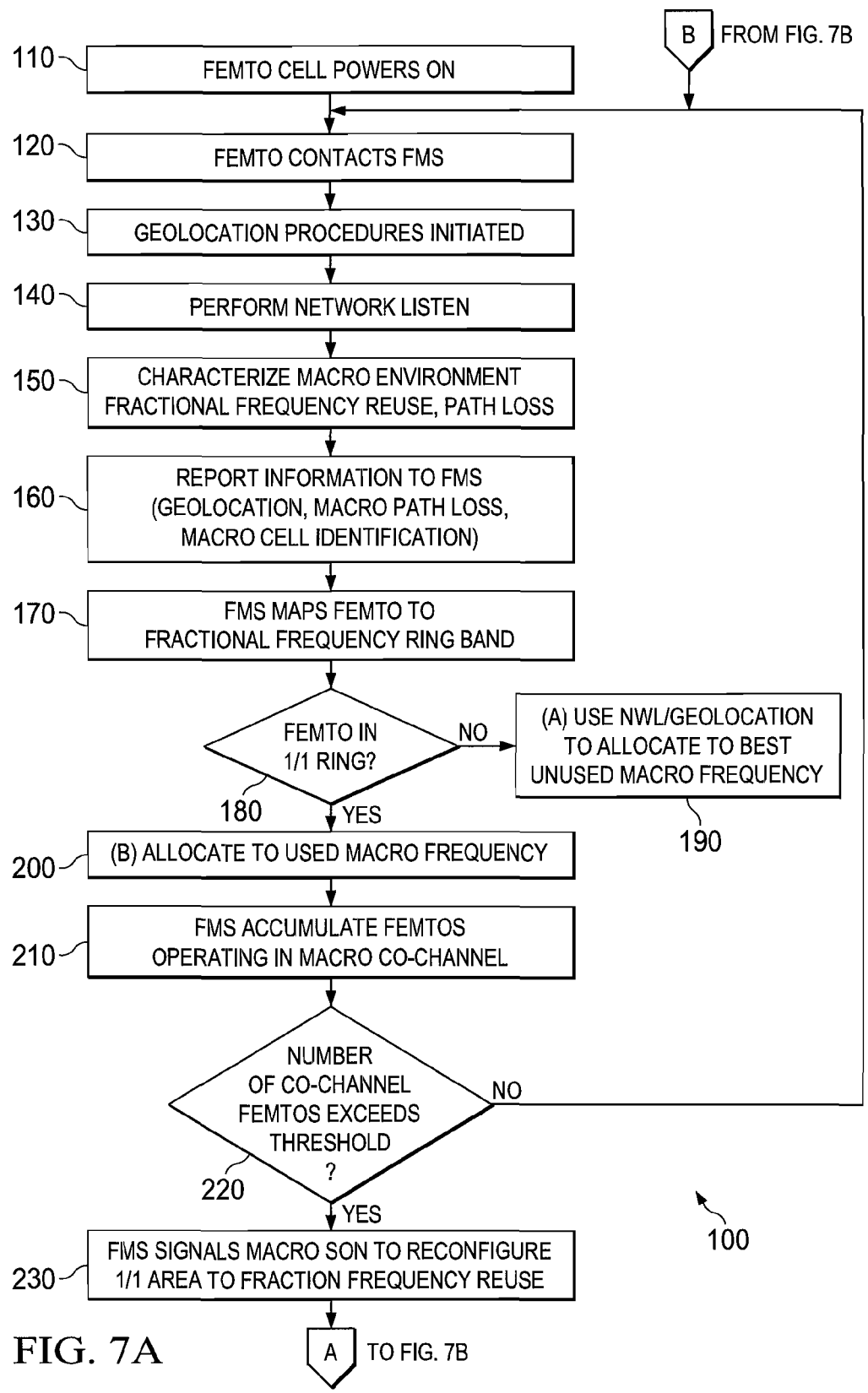
FIGS. 7A-7B are simplified flow diagrams that illustrate an example femto cell protocol for offering resource management in a network environment in accordance with one embodiment of the present disclosure.
Figure 7B:
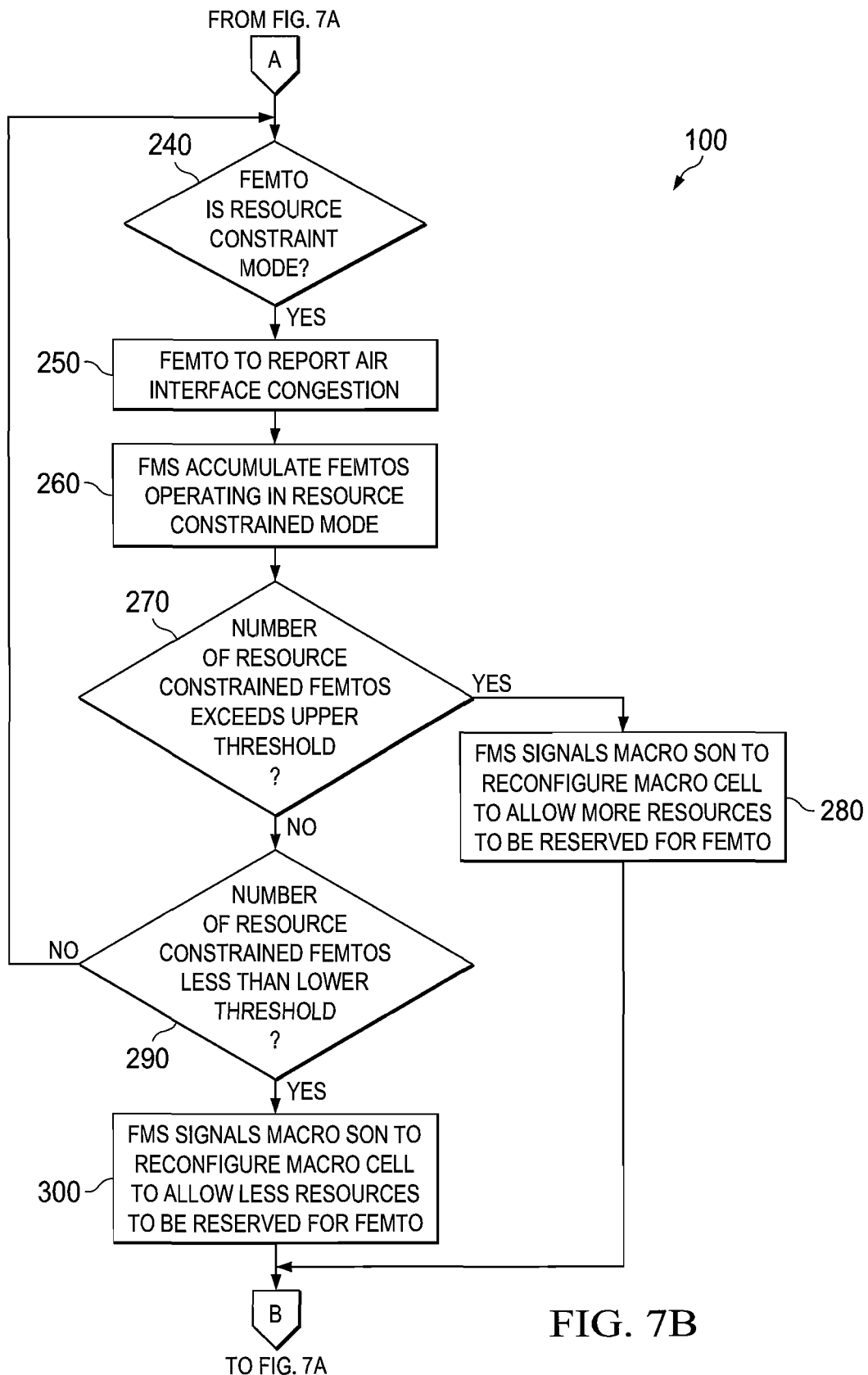

FIGS. 7A-7B are simplified flow diagrams illustrating one example operation 100 associated with communication system 10. Note that each FIGURE contains directional notations (A and B) to other portions of the illustrated diagrams. Beginning with FIG. 7A, a femto cell (i.e., a femto access point) can initially be powered on at step 110. At step 120, the femto can contact femto management system (FMS) 12. At step 130, geolocation procedures can be initiated. Subsequently, the femto cell can perform network listening functions at step 140. Any of these operating activities can be assisted by measurement and reporting module 20. At step 150, a characterization can be made for the macro environment (e.g., as to the location or the edge on which the femto resides, fractional frequency re-use, path loss associated with the macro cell, etc.). All of this information can be reported to femto management system 12 at step 160 for a determination as to the band in which the user resides. Thus, step 170 depicts femto management system 12 mapping the femto cell to a fractional frequency range band.

At step 180, a query is made as to whether this particular femto exists in the one of one (1/1) band, which includes F1, F2, and F3. If the answer to this inquiry is yes, then an allocation is made for the femto access point for the used macro frequency, as shown in step 200. Note that at this juncture, a computation is being made (as discussed above) as to what would achieve the largest throughput for the system (i.e., in the context of divvying frequencies amongst the femto and the macro cells). Thus, the term "allocate" is meant to encompass an intelligent determination as to how to best apportion available resources in organizing the network. Theoretically, all resources could be devoted to the macro cell or to the femto cell, but practically each will get a certain portion of the available resources. In essence, the question becomes how to optimize the limited resources, where that optimization can be a function of the number of femto cells (and how many femto cells reside in particular frequency bands), the location of femto cells, the macro cellular users, the macro cellular profile, the number of femto cell users, the path loss between the femto access point and macro network, etc. such that all of this information can be used in order to develop a solution that makes an efficient use of the available spectrum.

If the answer to this question posed in step 180 is no, then at step 190, network level or network layer (NWL) data can be used with geolocation information to allocate the best unused macro frequency for this particular femto cell. Note that in one example implementation, femto management system 12 can provide this intelligent analysis in how to best allocate limited resources. Femto management system 12 is in the position to see the system-wide view of the individual femto access points and the macro network. As a related issue, SON/radio resource management system 22 has a system-wide view of the macro cell environment. Thus, communications between SON/radio resource management system 22 and femto management system 12 can be used to intelligently provision resources amongst femto cells and macro cells. Their combined information can be used in order to optimize resources for a given set of femto users and macro users.

At step 210, femto management system 12 notices an accumulation of femtos (i.e., femto access points) operating in a macro co-channel environment. At step 220, a determination is made that a threshold for femto cells (occupying a number of channels) has been exceeded. If the threshold has been exceeded, then the flow moves to step 230, where femto management system 12 signals the macro self organizing network to reconfigure the 1/1 area to fraction frequency re-use. Note that step 220 is reflecting a second determination being made for allocating resources. In one sense, femto cells can be allocated a certain amount of resources, but due to changing conditions, these femto cells effectively need more resources for their operations. If there are a number of channels being used by the femto cells (and that number exceeds a predetermined threshold), then more resources are simply allocated (from the macro pool) for these femto access points. If there are sufficient resources for these femto cells, then the operational flow can be different in taking back some of these spectrums (i.e., resources). These reclaimed resources can be employed by the macro network again.

Thus, if the answer to the query of step 220 is no, then the flow moves to step 240 where a query is made as to whether the femto access point is operating in a resource constraint mode. If the answer to this question is yes, then the femto access point can report air interface congestion at step 250. At step 260, femto management system 12 can identify the accumulation of femtos operating in the resource constraint mode. At step 270, the number of resource constrained femtos is evaluated to determine whether the number exceeds an upper threshold. If it does exceed that number, then femto management system 12 can signal the macro self organizing network to reconfigure the macro cell to allow more resources to be reserved for the femto cell. This is illustrated by step 280.

If the answer to the query of step 270 is no, then a determination is made whether the number of resource constrained femtos is less than the lower threshold, as shown in step 290. If the answer to this question is yes, then femto management system 12 can signal the macro self organizing network to reconfigure the macro cell to allow less resources to be reserved for the femto cells. This is illustrated by step 300. If the answer to the query in step 290 is no, then additional resources can be reserved for the femto cell and the flow returns to step 240.

Note that without using the operations outlined herein, the system would have to be preconfigured with reservations for particular pieces of spectrum. The moment that certain femto cells would become inoperational, or stop using the spectrum resources, then the overall system throughput would suffer. Thus, a dynamic provisioning is more appropriate for optimally allocating resources between the femto cells and the macro cells.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIGS. 7A-B illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and broadcast protocols, communication system 10 may be applicable to other exchanges, routing protocols, or routed protocols in which packets (not necessarily the routing protocol/packets described) are exchanged in order to provide resource allocation data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

In a separate endeavor, communication system 10 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 10. In other examples, FIG. 1 could readily include a serving general packet radio service (GPRS) support node (SGSN), a gateway GPRS support node (GGSN), any type of network access server (NAS), etc. and all of these elements could interface with an authentication, authorization, and accounting (AAA) server. Moreover, the present disclosure is equally applicable to other cellular and/or wireless technology including CDMA, Wi-Fi, WiMax, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   receiving data from a femto access point;
   evaluating resources being used by a macro network in which the femto access point resides;
   determining whether the femto access point is operating in a constrained bandwidth mode; and
   reserving a particular resource for the femto access point to use for its communications, wherein the particular resource is allocated from available resources within the macro network.

2. The method of claim 1, further comprising:
   identifying a total throughput associated with the femto access point and one or more macro network cells, wherein a change in reserving the particular resource is executed based on determining the total throughput being higher than a current throughput.

3. The method of claim 1, wherein the data from the femto access point includes geolocation data and path loss data between the femto access point and the macro network, and wherein the femto access point is mapped to a fractional frequency range band.

4. The method of claim 1, wherein geolocation data is used in determining how to allocate the available resources in the macro network to one or more femto access points.

5. The method of claim 1, wherein if a number of resource constrained requests from one or more femto cells pass a predetermined threshold, self organizing network operations are triggered to shift a portion of the resources from the macro network to the one or more femto cells.

6. The method of claim 1, wherein cell channel power is measured during idle periods in order to determine if the femto access point is in proximity to a neighboring femto access point or the macro network using the same resources, wherein if the cell channel power passes a given threshold, a signal is sent to a femto management element.

7. The method of claim 1, further comprising:
   establishing a message exchange between multiple femto cells in close proximity to each other, wherein the message exchange is used to identify resource utilization between the multiple femto cells.

8. The method of claim 1, further comprising:
   allocating spectrum resources corresponding to sub-carrier allocations between the femto access point and the macro network.

9. Logic encoded in one or more tangible media that includes code for execution and when executed by a processor operable to perform operations comprising:
   receiving data from a femto access point;
   evaluating resources being used by a macro network in which the femto access point resides;
   determining whether the femto access point is operating in a constrained bandwidth mode; and
   reserving a particular resource for the femto access point to use for its communications, wherein the particular resource is allocated from available resources within the macro network.

10. The logic of claim 9, the operations further comprising:
    identifying a total throughput associated with the femto access point and one or more macro network cells, wherein a change in reserving the particular resource is executed based on determining the total throughput being higher than a current throughput.

11. The logic of claim 9, wherein geolocation data is used in determining how to allocate the available resources in the macro network to one or more femto access points.

12. The logic of claim 9, wherein if a number of resource constrained requests from one or more femto cells pass a predetermined threshold, self organizing network operations are triggered to shift a portion of the resources from the macro network to the one or more femto cells.

13. The logic of claim 9, wherein cell channel power is measured during idle periods in order to determine if the femto access point is in proximity to a neighboring femto access point or the macro network using the same resources, wherein if the cell channel power passes a given threshold, a signal is sent to a femto management element.

14. An apparatus, comprising:
    a memory element configured to store data,
    a processor operable to execute instructions associated with the data, and
    a coordination module configured to interface with the processor in order to:
    receive data from a femto access point;
    evaluate resources being used by a macro network in which the femto access point resides;
    determine whether the femto access point is operating in a constrained bandwidth mode; and
    reserve a particular resource for the femto access point to use for its communications, wherein the particular resource is allocated from available resources within the macro network.

15. The apparatus of claim 14, wherein the coordination module is further configured to:
    identify a total throughput associated with the femto access point and one or more macro network cells, wherein a change in reserving the particular resource is executed based on determining the total throughput being higher than a current throughput.

16. The apparatus of claim 14, wherein the data from the femto access point includes geolocation data and path loss data between the femto access point and the macro network, and wherein the femto access point is mapped to a fractional frequency range band.

17. The apparatus of claim 14, wherein geolocation data is used in determining how to allocate the available resources in the macro network to one or more femto access points.

18. The apparatus of claim 14, wherein if a number of resource constrained requests from one or more femto cells pass a predetermined threshold, self organizing network operations are triggered to shift a portion of the resources from the macro network to the one or more femto cells.

19. The apparatus of claim 14, wherein the femto access point includes a measurement and reporting module configured to generate the data to be sent to a femto management element.

20. The apparatus of claim 14, wherein a message exchange is established between multiple femto cells in close proximity to each other, wherein the message exchange is used to identify resource utilization between the multiple femto cells.

* * * * *